US00RE47091E

(19) United States
(12) Reissued Patent
Seo et al.

(10) Patent Number: US RE47,091 E
(45) Date of Reissued Patent: *Oct. 16, 2018

(54) METHOD AND APPARATUS FOR REPORTING A CHANNEL QUALITY IN A WIRELESS COMMUNICATION SYSTEM

(71) Applicant: LG ELECTRONICS INC., Seoul (KR)

(72) Inventors: Dong Youn Seo, Anyang-si (KR); Min Gyu Kim, Anyang-si (KR); Suck Chel Yang, Anyang-si (KR); Joon Kui Ahn, Anyang-si (KR)

(73) Assignee: LG ELECTRONICS INC., Seoul (KR)

( * ) Notice: This patent is subject to a terminal disclaimer.

(21) Appl. No.: 15/015,975

(22) Filed: Feb. 4, 2016

Related U.S. Patent Documents

Reissue of:
(64) Patent No.: 8,644,182
Issued: Feb. 4, 2014
Appl. No.: 13/516,950
PCT Filed: Dec. 16, 2010
PCT No.: PCT/KR2010/009002
§ 371 (c)(1),
(2) Date: Jun. 18, 2012
PCT Pub. No.: WO2011/074885
PCT Pub. Date: Jun. 23, 2011

U.S. Applications:
(63) Continuation of application No. 15/015,707, filed on Feb. 4, 2016, which is an application for the reissue of Pat. No. 8,644,182.
(Continued)

(51) Int. Cl.
*H04W 24/10* (2009.01)
*H04L 5/00* (2006.01)

(52) U.S. Cl.
CPC ..... *H04L 5/0057* (2013.01)

(58) Field of Classification Search
CPC ..... H04L 5/0057
(Continued)

(56) References Cited

U.S. PATENT DOCUMENTS

2008/0214198 A1* 9/2008 Chen et al. ..... 455/450
2008/0233964 A1* 9/2008 McCoy et al. ..... 455/450
(Continued)

FOREIGN PATENT DOCUMENTS

CN 101156322 A 4/2008
CN 101204050 A 6/2008
(Continued)

OTHER PUBLICATIONS

3GPP, "3rd Generation Partnership Project; Technical Specification Group Radio Access Network; Evolved Universal Terrestrial Radio Access (E-UTRA); Physical Channels and Modulation (Release 8)," 3GPP TS 36.211 V8.9.0, Dec. 2009 (Server date Dec. 9, 2009), pp. 1-83.
(Continued)

*Primary Examiner* — Eron J Sorrell
(74) *Attorney, Agent, or Firm* — Birch, Stewart, Kolasch & Birch, LLP

(57) ABSTRACT

[The present invention provided a method and apparatus for reporting a channel quality in a wireless communication system. A terminal receives an uplink grant from a base station via one of a plurality of downlink component carriers (CCs). The uplink grant includes a channel quality indicator (CQI) request for instructing uplink allocation and CQI reporting. The terminal reports the CQI of the downlink CC being linked to the base station. The downlink CC being linked is one of the plurality of downlink CCs, which is linked to the uplink CC for which the uplink allocation is scheduled.] *A method and an apparatus for reporting channel quality are discussed. The method according to an embodiment includes receiving, by a terminal configured*
(Continued)

*with a plurality of downlink component carriers (CCs), control information from a base station, the control information including an uplink allocation and a CQI request, the control information including a carrier indicator field (CIF) indicating an uplink CC in which the uplink allocation is scheduled; and transmitting, by the terminal to the base station, the CQI through an uplink CC. The CQI request indicates one of: a triggering of CQI reporting for one downlink CC linked to the uplink CC, indicated by the CIF, among the plurality of downlink CCs; and a triggering of CQI reporting for a first group of downlink CCs among the plurality of downlink CCs.*

12 Claims, 8 Drawing Sheets

Related U.S. Application Data

(60) Provisional application No. 61/287,168, filed on Dec. 16, 2009.

(58) Field of Classification Search
USPC ..... 370/328
See application file for complete search history.

(56) References Cited

U.S. PATENT DOCUMENTS

2009/0130986 A1* 5/2009 Yun et al. ..... 455/67.11
2009/0204863 A1 8/2009 Kim et al.
2010/0002655 A1* 1/2010 Ofuji et al. ..... 370/335
2010/0118817 A1* 5/2010 Damnjanovic et al. ..... 370/329
2010/0226327 A1* 9/2010 Zhang et al. ..... 370/329
2010/0227569 A1* 9/2010 Bala ..... H04L 5/0007 455/73
2010/0232373 A1* 9/2010 Nory ..... H04W 72/1289 370/329
2010/0234037 A1* 9/2010 Terry ..... H04L 1/0023 455/450
2010/0271970 A1* 10/2010 Pan et al. ..... 370/252
2011/0076962 A1* 3/2011 Chen et al. ..... 455/68
2011/0105050 A1* 5/2011 Khandekar ..... H04L 5/001 455/68
2011/0134771 A1* 6/2011 Chen et al. ..... 370/252
2011/0141985 A1* 6/2011 Larsson ..... H04L 5/0064 370/329
2011/0305161 A1* 12/2011 Ekpenyong et al. ..... 370/252
2012/0044894 A1* 2/2012 Ko ..... H04L 1/0026 370/329

FOREIGN PATENT DOCUMENTS

CN 101405966 A 4/2009
CN 101540632 A 9/2009
KR 10-2008-0064504 A 7/2008
WO WO 2009/096752 A1 8/2009
WO WO 2009/096757 A2 8/2009

OTHER PUBLICATIONS

3GPP, "3rd Generation Partnership Project; Technical Specification Group Radio Access Network; Evolved Universal Terrestrial Radio Access (E-UTRA); Physical layer procedures (Release 8)," 3GPP TS 36.213 V8.8.0, Sep. 2009, pp. 1-81.
Catt, "CQI feedback for LTE-A," 3GPP TSG RAN WG1 Meeting #59, R1-094544, Jeju, Korea, Nov. 9-13, 2009, 5 pages.
CMCC, "ULACK/NACK and CQI feedback in Carrier Aggregation," 3GPP TSG RAN WG1 meeting #58, R1-093269, Shenzhen, China, Aug. 24-28, 2009, 2 pages.
LG Electronics, "UL control channel design to support carrier aggregation," 3GPP TSG RAN WG1 #56bis, R1-091204, Seoul, Korea, Mar. 23-27, 2009, 6 pages.
Motorola, "Control Signalling Design for Supporting Carrier Aggregation", 3GPP TSG RAN1 #56, R1-090792 Athens, Greece, Feb. 9, 2009.
Panasonic, "PHICH Linkage for asymmetric carrier aggregation", 3GPP TSG RAN WG1 Meeting #56, R1-090683, Athens, Greece, Feb. 9-13, 2009.
LG Electronics, "Uplink control channel transmission for LTE-Advanced", 3GPP TSG RAN WG1 #56, R1-090656, Athens, Greece, Feb. 9-13, 2009.
NTT Docomo, "Initial Access Procedure for Assymetric Wider Bandwidth in LTE-Advanced", 3GPP TSG RAN WG1 Meeting #56, R1-090897, Athens, Greece, Feb. 9-13, 2009.

* cited by examiner

METHOD AND APPARATUS FOR REPORTING A CHANNEL QUALITY IN A WIRELESS COMMUNICATION SYSTEM

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE TO RELATED APPLICATIONS

[This application is the National Phase of PCT/KR2010/009002 filed on Dec. 16, 2010, which claims priority under 35 U.S.C. §119(e) to U.S. Provisional Application No. 61/287,168 filed on Dec. 16, 2009, all of which are hereby expressly incorporated by reference into the present application.] *This application is a Reissue Continuation Application of U.S. patent application Ser. No. 15/015,707 filed on Feb. 4, 2016, which is a Reissue application of U.S. Pat. No. 8,644,182 issued on Feb. 4, 2014, which is the National Phase of PCT International Application No. PCT/KR2010/009002 filed on Dec. 16, 2010, which claims the benefit under 35 U.S.C. § 119(e) to U.S. Provisional Application No. 61/287,168 filed on Dec. 16, 2009, all of which are hereby expressly incorporated by reference into the present application. Notice: More than one reissue application has been filed for the reissue of U.S. Pat. No. 8,644,182. The reissue applications are application Ser. Nos. 15/015,975 (the present application) and 15/015,707 (the parent of the present application).*

TECHNICAL FIELD

The present invention relates to wireless communications, and more particularly, to a method and apparatus for reporting channel quality in a wireless communication system.

BACKGROUND ART

In order to increase efficiency of a wireless communication system, it is essential to know channel quality. Quality of a downlink channel is reported by a base station to a user equipment. An indicator for indicating the channel quality is called a channel quality indicator (CQI) or a channel state indicator (CSI).

The CQI may be a value obtained by quantizing a channel state (e.g., a signal to interference-plus-noise ratio (SINR), a carrier to interference and noise ratio (CINR), a bit error rate (BER), and a frame error rate (FER)) or a modulation and coding scheme (MCS) index in an MCS table. In addition, the CQI may include a rank indicator (RI) and/or a precoding matrix indicator (PMI) in a multi-antenna system.

Long term evolution (LTE) based on 3$^{rd}$ generation partnership project (3GPP) technical specification (TS) release 8 is a promising next-generation mobile communication standard.

In a typical wireless communication system, one component carrier is considered in general even if a bandwidth is differently set between an uplink and a downlink. In 3$^{rd}$ 3GPP LTE, one carrier constitutes each of the uplink and the downlink on the basis of a single carrier, and the bandwidth of the uplink is symmetrical to the bandwidth of the downlink in general.

However, except for some areas of the world, it is difficult to allocate frequencies of wide bandwidths. Therefore, as a technique for effectively using fragmented small bands, a spectrum aggregation technique is being developed to obtain the same effect as when a band of a logically wide bandwidth is used by physically aggregating a plurality of bands in a frequency domain.

The spectrum aggregation includes a technique for supporting a system bandwidth of 100 mega Hertz (MHz) by using multiple carriers even if, for example, the 3GPP LIE supports a bandwidth of up to 20 MHz, and a technique for allocating an asymmetric bandwidth between the uplink and the downlink.

The 3GPP LTE is designed to report channel quality on the basis of a single-component carrier. However, with the introduction of multiple carriers, there is a need for a method capable of reporting channel quality in a multi-carrier system.

SUMMARY OF INVENTION

Technical Problem

The present invention provides a method and apparatus for reporting channel quality in a wireless communication system.

Technical Solution

In an aspect, a method for reporting channel quality in a wireless communication system includes receiving an uplink grant from a base station through one of a plurality of downlink component carriers (CCs), the uplink grant including an uplink allocation and a channel quality indicator (CQI) indicating a triggering of CQI reporting, and reporting a CQI of a linked downlink CC to the base station. The linked downlink CC is a downlink CC linked to an uplink CC in which the uplink allocation is scheduled among the plurality of downlink CCs.

The uplink grant may further include a carrier indicator field (CIF) indicating the uplink CC in which the uplink allocation is scheduled.

The method may further include receiving system information including a first CC linkage between at least one uplink CC and the plurality of downlink CCs from the base station. The uplink CC in which the uplink allocation is scheduled may be determined according to the first CC linkage.

The method may further include receiving a radio resource control (RRC) message including a second CC linkage between at least one uplink CC and the plurality of downlink CCs from the base station. The uplink CC in which the uplink allocation is scheduled may be determined according to the second CC linkage.

In another aspect, an apparatus configured for reporting channel quality in a wireless communication system is provided. The apparatus includes a radio frequency (RF) unit configured for transmitting and receiving a radio signal, and a processor coupled to the RF unit and configured for receiving an uplink grant from a base station through one of a plurality of downlink component carriers (CCs), the uplink grant including an uplink allocation and a channel quality indicator (CQI) indicating a triggering of CQI reporting, and reporting a CQI of a linked downlink CC to the base station.

The linked downlink CC is a downlink CC linked to an uplink Cc in which the uplink allocation is scheduled among the plurality of downlink CCs.

Advantageous Effects

The present invention provides a method for transmitting a control signal in a multi-carrier system capable of cross carrier scheduling. More specifically, a method and apparatus for reporting channel quality are proposed.

MODE FOR INVENTION

A user equipment (UE) may be fixed or mobile, and may be referred to as another terminology, such as a mobile station (MS), a mobile terminal (MT), a user terminal (UT), a subscriber station (SS), a wireless device, a personal digital assistant (PDA), a wireless modem, a handheld device, etc.

A base station (BS) is generally a fixed station that communicates with the UE and may be referred to as another terminology, such as an evolved node-B (eNB), a base transceiver system (BTS), an access point, etc.

Each BS provides a communication service to a specific geographical region (generally referred to as a cell). The cell can be divided into a plurality of regions (referred to as sectors).

Figure 1:
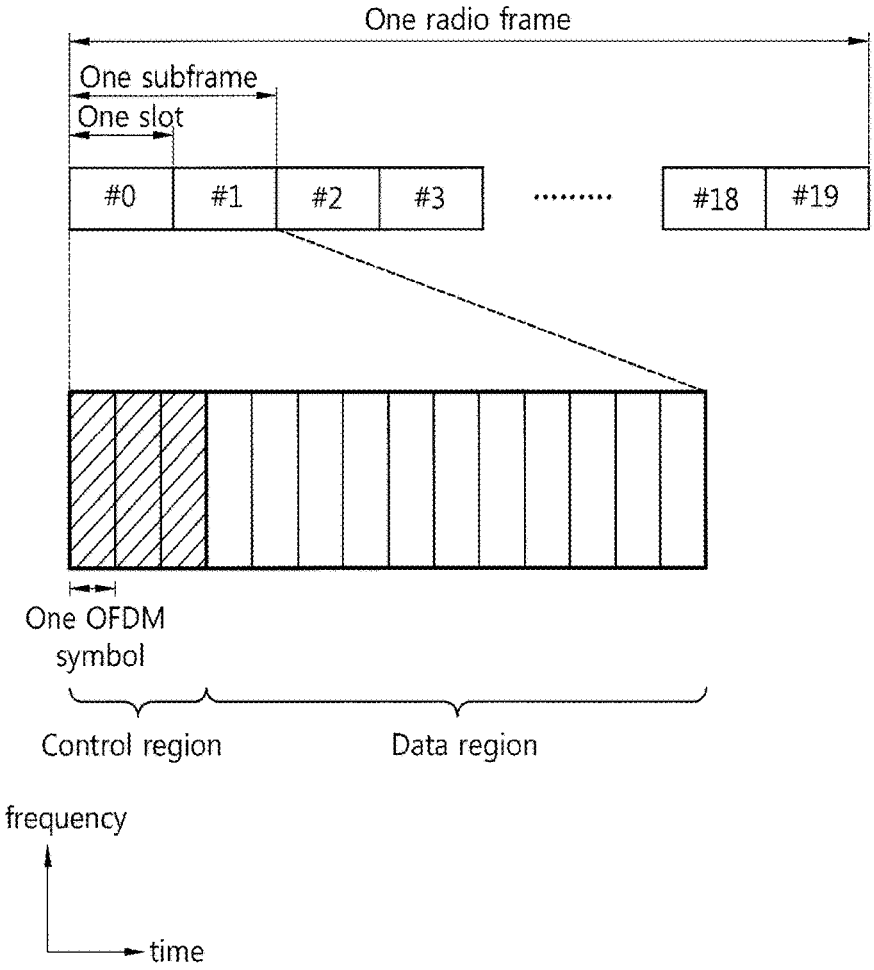
FIG. 1 shows a downlink radio frame structure in $3^{rd}$ generation partnership project (3GPP) long term evolution (LTE).

FIG. 1 shows a downlink radio frame structure in $3^{rd}$ generation partnership project (3GPP) long term evolution (LTE). The section 6 of 3GPP TS 36.211 V8.7.0 (2009-05) "Evolved Universal Terrestrial Radio Access (E-UTRA); Physical Channels and Modulation (Release 8)" may be incorporated herein by reference.

A radio frame consists of 20 subframes indexed with 0 to 19. One subframe consists of 2 slots. A time required for transmitting one subframe is defined as a transmission time interval (TTI). For example, one subframe may have a length of 1 millisecond (ms), and one slot may have a length of 0.5 ms.

One slot may include a plurality of orthogonal frequency division multiplexing (OFDM) symbols in a time domain. Since the 3GPP LTE uses orthogonal frequency division multiple access (OFDMA) in a downlink (DL), the OFDM symbol is only for expressing one symbol period in the time domain, and there is no limitation in a multiple access scheme or terminologies. For example, the OFDM symbol may also be referred to as another terminology such as a single carrier frequency division multiple access (SC-FDMA) symbol, a symbol period, etc.

Although it is described that one slot includes 7 OFDM symbols for example, the number of OFDM symbols included in one slot may vary depending on a length of a cyclic prefix (CP). According to 3GPP TS 36.211 V8.7.0, in case of a normal CP, one subframe includes 7 OFDM symbols, and in case of an extended CP, one subframe includes 6 OFDM symbols.

A resource block (RB) is a resource allocation unit, and includes a plurality of subcarriers in one slot. For example, if one slot includes 7 OFDM symbols in a time domain and the RB includes 12 subcarriers in a frequency domain, one RB can include 7×12 resource elements (REs).

A DL subframe is divided into a control region and a data region in the time domain. The control region includes up to three preceding OFDM symbols of a $1^{st}$ slot in the subframe. The number of OFDM symbols included in the control region may vary. A physical downlink control channel (PDCCH) is allocated to the control region, and a physical downlink shared channel (PDSCH) is allocated to the data region.

As disclosed in 3GPP TS 36.211 V8.7.0, the 3GPP LTE classifies a physical channel into a data channel and a control channel. Examples of the data channel include a physical downlink shared channel (PDSCH) and a physical uplink shared channel (PUSCH). Examples of the control channel include a physical downlink control channel (PDCCH), a physical control format indicator channel (PCFICH), a physical hybrid-ARQ indicator channel (PHICH), and a physical uplink control channel (PUCCH).

The PCFICH transmitted in a $1^{st}$ OFDM symbol of the subframe carries a control format indicator (CFI) regarding the number of OFDM symbols (i.e., a size of the control region) used for transmission of control channels in the subframe. The UE first receives the CFI through the PCFICH, and thereafter monitors the PDCCH.

The PHICH carries a positive-acknowledgement (ACK)/negative-acknowledgement (HACK) signal for uplink hybrid automatic repeat request (HARQ). The ACK/NACK signal for uplink (UL) data on the PUSCH transmitted by the UE is transmitted on the PHICH.

Control information transmitted through the PDCCH is referred to as downlink control information (DCI). The DCI may include a resource allocation of the PDSCH (this is referred to as a DL grant), a resource allocation of a PUSCH (this is referred to as a UL grant), a set of transmit power control commands for individual UEs in any UE group and/or activation of a voice over Internet protocol (VoIP).

The DCI on the PDCCH is received by using blind decoding. A plurality of candidate PDCCHs can be transmitted in the control region of one subframe. The UE monitors the plurality of candidate PDCCHs in every subframe. Herein, monitoring is an operation in which the UE attempts decoding of each PDCCH according to a format of PDCCH to be monitored. The UE monitors a set of PDCCH candidates in a subframe to find its own PDCCH. For example, if there is no cyclic redundancy check (CRC) error detected by performing de-making on an identifier (i.e., cell-radio network temporary identifier (RNTI)) of the UE in a corresponding PDCCH, the UE detects this PDCCH as a PDCCH having its DCI.

In order to receive DL data, the UE first receives a DL grant on the PDCCH. DL data on the PDSCH is received by using the DL grant. In addition, to transmit UL data, the UE first receives a UL grant on the PDCCH. UL data is transmitted on the PUSCH by using the UL grant.

A physical broadcast channel (PBCH) is transmitted in first four OFDM symbols in a $2^{nd}$ slot of a $1^{st}$ subframe of a radio frame. The PBCH carries system information necessary for communication between a UE and a BS. The system information transmitted through the PBCH is referred to as a master information block (MIB). In comparison thereto, system information transmitted through the PDCCH is referred to as a system information block (SIB).

Now, channel quality reporting in 3GPP LTE will be described with reference to the section 7.2 of 3GPP TS 36.213 V8.7.0(2009-05).

Figure 2:
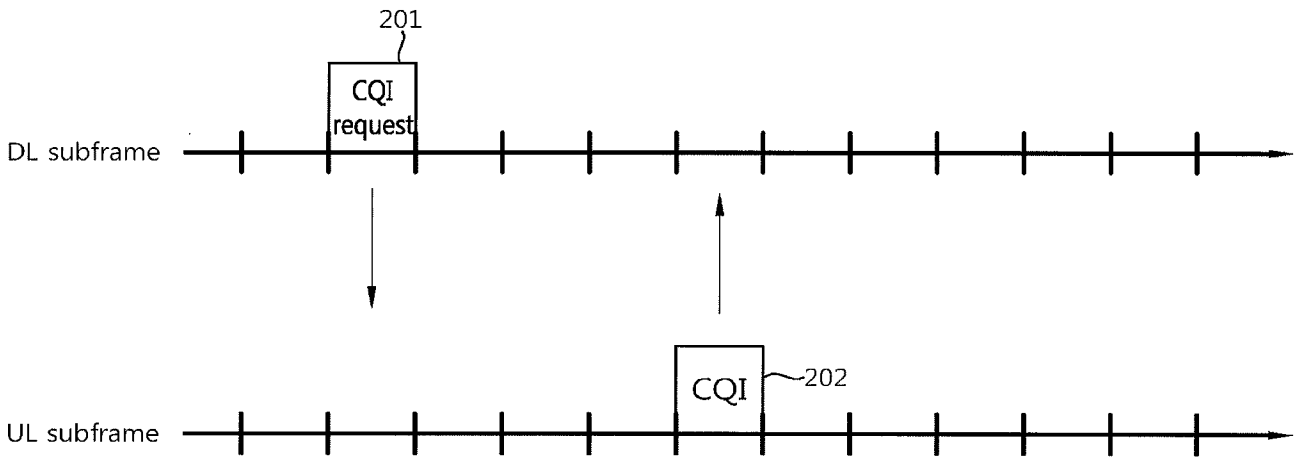
FIG. 2 shows channel quality indicator (CQI) reporting in the conventional 3GPP LTE.

FIG. 2 shows CQI reporting in the conventional 3GPP LTE.

ABS transmits a CQI request 201 through a PDCCH in a DL subframe. The CQI request 201 is included in a DCI format 0 or a random access response. The DCI format 0 is used for transmission of a UL grant. The UL grant further includes a UL resource allocation for a PUSCH.

The CQI request 201 indicates whether CQI reporting is triggered by using a 1-bit field. For example, if a value of the CQI request 201 is set to '1', it means that the BS requests the UE to perform CQI reporting.

If the CQI request 201 indicates the triggering of the CQI reporting, the UE transmits a CQI 202 to the BS through a PUSCH.

Since the UE reports the CQI at the request of the BS, this is called aperiodic CQI reporting.

In 3GPP LTE, there are three types of CQI feedback, that is, Wideband, UE selected, and Higher layer-configured. In addition, there are also three types of PMI feedback, that is, No PMI, Single PMI, and Multiple PMI. According to the CQI feedback type and the PMI feedback type, a transmission mode is divided as shown in Table 1 below.

TABLE 1

| | No PMI | Single PMI | Multiple PMI |
|---|---|---|---|
| Wideband (wideband CQI) | | | Mode 1-2 |
| UE selected (subband CQI) | Mode 2-0 | | Mode 2-2 |
| Higher layer-configured (subband CQI) | Mode 3-0 | Mode 3-1 | |

According to the mode 1-2, a PMI is selected under the assumption that data is transmitted in each subband. The UE determines a CQI by assuming the selected PMI with respect to a system band or a whole band designated by a higher layer (such a band is called a set S). The UE transmits the CQI and the PMI of each subband. Since the CQI of a whole band or subbands included in the set S is transmitted, it is called a wideband CQI. A size of each subband may vary depending on a size of the system band.

According to the mode 2-0, the UE selects M (M>0) preferred subbands in the system band or the set S. The UE determines a CQI for the selected M subbands (such a subband is called a subband CQI). In addition, the UE additionally determines a wideband CQI with respect to the system band or the set S. The UE transmits the selected M subbands, one CQI for the selected M subbands, and the wideband CQI.

According to the mode 2-2, M preferred subbands and a single PMI for the M preferred subbands are determined. In addition, the UE determines a wideband CQI with respect to the system band or the set S. The UE transmits the selected M subbands, one CQI for the selected M subbands, a single PMI for the M selected subbands, and a wideband CQI.

According to the mode 3-0, the UE determines the wideband CQI. Further, the UE determines a CQI for each subband.

According to the mode 3-1, the UE determines a single PMI with respect to the system band or the set S. The UE determines a wideband CQI and a subband CQI for each subband by assuming the single PMI.

Meanwhile, uplink power control is used in the wireless communication system. The BS increases uplink power when a channel environment is not good, and decreases the uplink transmit power when the channel environment is good. This is to decrease interference to a neighboring cell due to excessive transmit power and to optimize a power usage amount as much as possible.

In 3GPP LTE, a transmit power command (TPC) is used for uplink transmit power control, and transmit power is controlled independently in each of a PUCCH and a PUSCH. In general, the TPC for the PUCCH used in transmission of an HARQ ACK/NACK signal is included in a DL grant. Further, the TPC for the PUSCH is included in a UL grant.

Now, a multiple-carrier system will be described.

To support a higher data rate, a multiple-carrier system supporting a plurality of component carriers (CCs) is taken into account.

Spectrum aggregation (or bandwidth aggregation, also referred to as carrier aggregation) supports a plurality of CCs. The spectrum aggregation is introduced to support an increasing throughput, to prevent a cost increase caused by using a broadband radio frequency (RF) element, and to ensure compatibility with legacy systems. For example, if 5 CCs are assigned as a granularity of a carrier unit having a bandwidth of 20 MHz, a bandwidth of up to 100 MHz can be supported.

Figure 3:
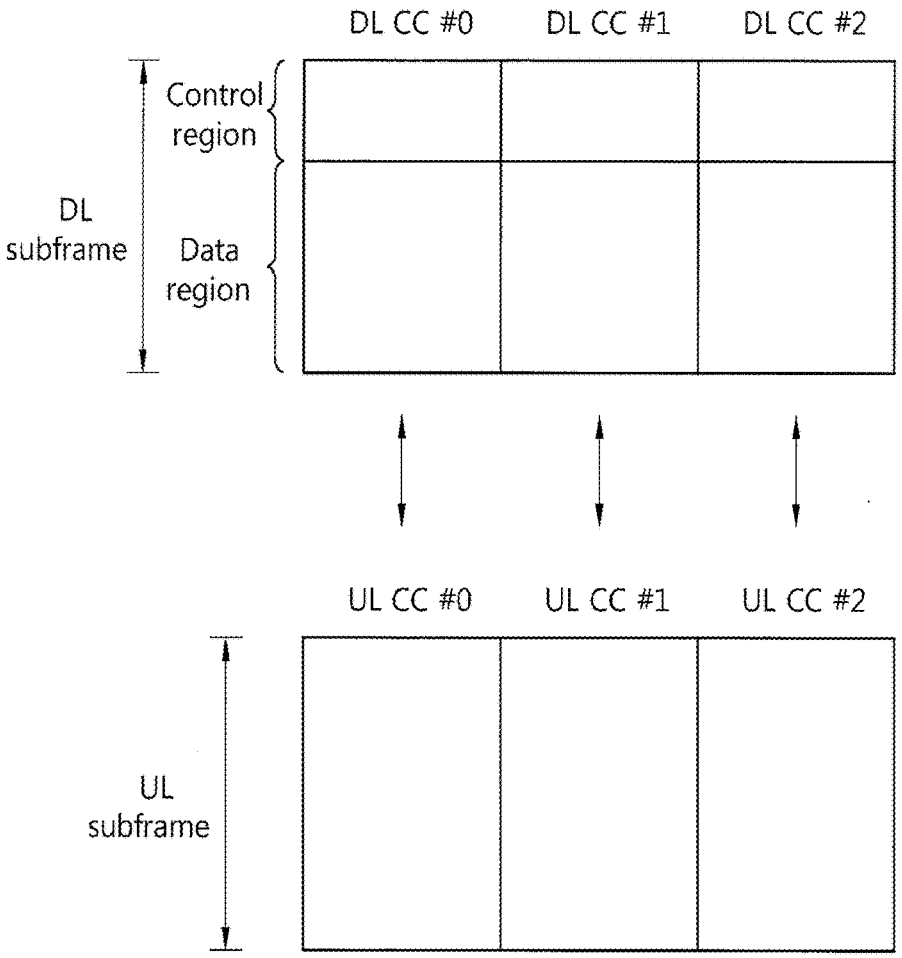
FIG. 3 shows an example of multiple carriers

FIG. 3 shows an example of multiple carriers. Although three DL CCs and three UL CCs are shown herein, the number of DL CCs and the number of UL CCs are not limited thereto. A PDCCH and a PDSCH are independently transmitted in each DL CC. A PUCCH and a PUSCH are independently transmitted in each UL CC.

Figure 4:
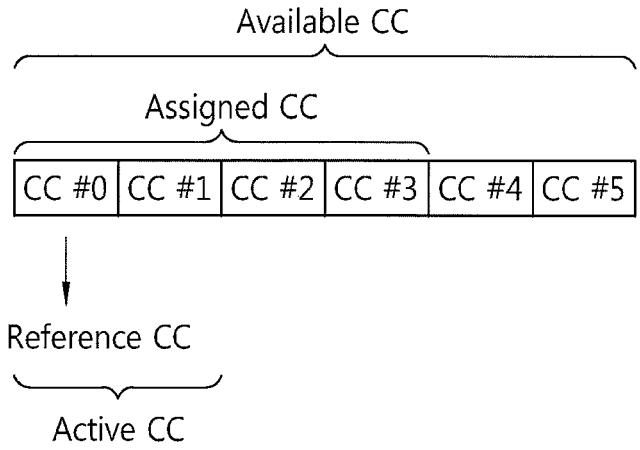
FIG. 4 shows an example of a multi-carrier operation.

FIG. 4 shows an example of a multi-carrier operation. Even if a multi-carrier system supports a plurality of CCs, the number of supported CCs may differ depending on a cell or UE capability.

An available CC indicates all CCs that can be used by the system. Herein, there are 6 CCs (i.e., CC #0 to CC #5).

An assigned CC is a CC assigned by a BS to a UE according to the UE capacity among available CCs. Although it is shown that the CC #0 to the CC #3 are assigned CCs, the number of assigned CCs may be less than or equal to the number of available CCs.

An active CC is a CC used by the UE to perform reception and/or transmission of a control signal and/or data with respect to the BS. The UE can perform PDCCH monitoring and/or PDSCH buffering with respect to some or all of the active CCs. The active CCs can be activated or deactivated among the assigned CCs. Among the active CCs, a CC which is always activated is called a reference CC.

In a multi-carrier system, a CC linkage can be defined between a DL CC and a UL CC. The CC linkage implies a mapping relation between a DL CC in which a PDCCH for carrying a UL grant is transmitted and a UL CC scheduled by the UL grant. Alternatively, the CC linkage may be a mapping relation between a DL CC (or UL CC) in which data for HARQ is transmitted or a UL CC (or DL CC) in which an HARQ ACK/NACK signal is transmitted. The CC linkage may be a relationship between a DL CC which is a target of CQI reporting and a UL CC for transmitting a CQI.

The example of FIG. 3 shows a symmetric CC linkage in which a DL CC and a UL CC are one-to-one mapped.

The CC linkage can be configured as a static CC linkage and a dynamic CC linkage as follows.

In a first method, the CC linkage is fixed. This is called a fixed CC linkage or a static CC linkage. This can be signaled by using system information which is common information. Since a UL CC to be scheduled by a UL grant can be determined through the static CC linkage, additional signaling for configuring a linkage between a UL CC and a DL CC and transmitted for each UE is not necessary.

In a second method, the CC linkage is dynamically or semi-statically changed or overridden. This is called the dynamic CC linkage. This can be reported by the BS to the UE by using a radio resource control (RRC) message or L1/L2 signaling. The dynamic CC linkage can be UE-specific (in this case, it can be specific for each CC or may be common for each CC), or can be UE group-specific or cell-specific. The dynamic CC linkage can be mapped in a 1:1 manner or 1:M or M:1 manner Two methods are possible as CC scheduling.

In a first method, a fixed CC linkage is utilized. A UL grant is transmitted through a DL CC. A UL transport block is transmitted by using the UL grant through a UL CC linked to the DL CC. Since a UL CC to be scheduled by the UL grant can be determined through a predefined CC linkage, additional signaling is not necessary.

In a second method, a CC to be scheduled is directly indicated. For example, a PDCCH and a PDSCH are transmitted in different DL CCs, or a PUSCH is transmitted through a UL CC not linked to a DL CC in which the PDCCH is transmitted. This is called cross-carrier scheduling.

Figure 5:
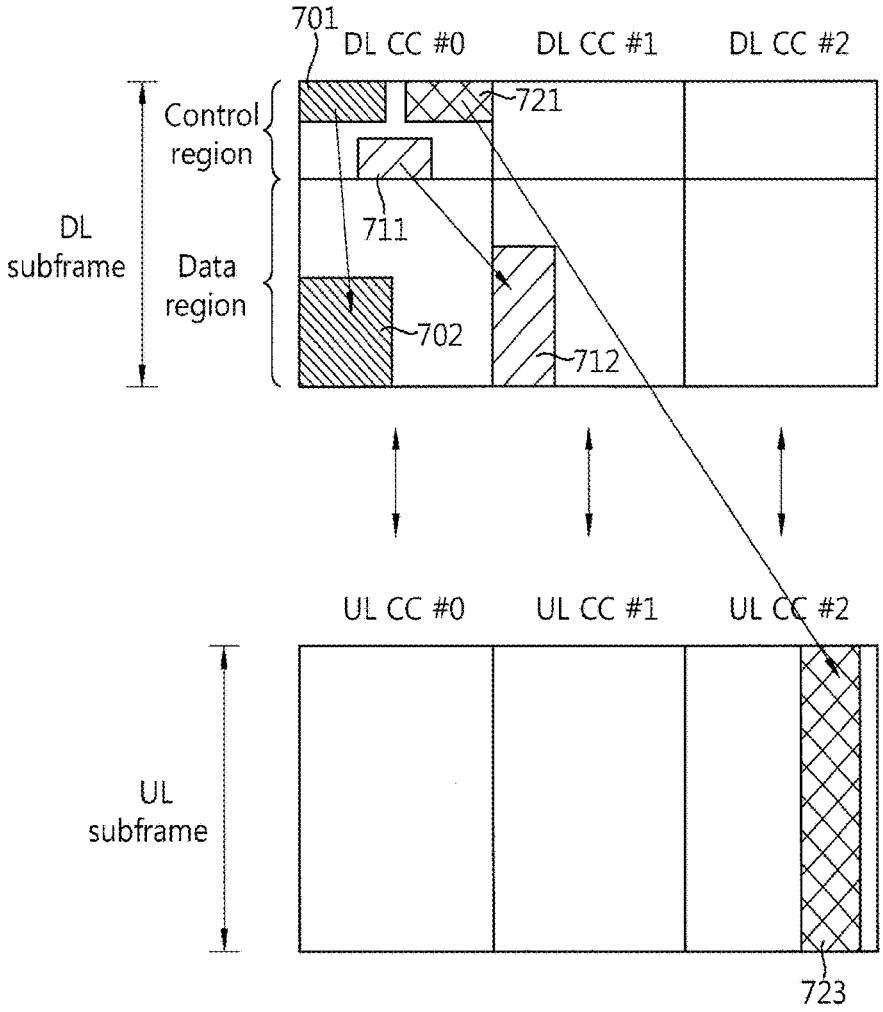
FIG. 5 shows an example of cross-carrier scheduling.

FIG. 5 shows an example of cross-carrier scheduling. It is assumed that a DL CC #0 is linked to a UL CC #0, a DL CC #1 is linked to a UL CC #1, and a DL CC #2 is linked to a UL CC #2.

A 1$^{st}$ PDCCH [710] *701* of the DL CC #0 carries DCI for a PDSCH 702 of the same DL CC #0. A 2$^{nd}$ PDCCH 711 of the DL CC #0 carries DCI for a PDSCH 712 of the DL CC #1. A 3$^{rd}$ PDCCH 721 of the DL CC #0 carries DCI for a PUSCH [722] *723* of the unlinked UL CC #2.

For cross-carrier scheduling, the DCI of the PDCCH may include a carrier indicator field (CIF). The CIF indicates a DL CC or a UL CC scheduled through the DCI. The CIF may include an index of a UL CC or an index of a DL CC scheduled through the DCI. For example, the 2$^{nd}$ PDCCH 711 may include a CIF indicating the DL CC #1. The 3$^{rd}$ PDCCH 721 may include a CIF indicating the UL CC #2.

As described above, in the conventional 3GPP LTE, a UL frequency band and a DL frequency band correspond to each other, and only one UL and one DL CC are present. Therefore, a TPC included in DCI for a DL grant is control information for a UL CC corresponding to a DL CC, and a CQI request included in DCI for a UL grant is control information for a DL CC corresponding to a scheduled UL CC.

However, an ambiguity may occur in a multi-carrier system using a plurality of CCs according to the conventional 3GPP LTE structure.

More specifically, a 3$^{rd}$ PDCCH 721 transmitted through a DL CC #0 carries a UL grant for scheduling a UL CC #2. Assume that the UL CC #2 is linked to a DL CC #2. In this case, when a CQI request is included in the UL grant, whether the CQI request is a CQI for one DL CC or a CQI for a DL CC group (or all CCs)or which CC(s) is a target DL CC thereof may be ambiguous.

For example, if the CQI request is for one CC, it may be ambiguous whether the CQI request is for requesting CQI reporting for the DL CC #0 in which the 3$^{rd}$ PDCCH 721 is transmitted or is for requesting CQI reporting for the DL CC #2 linked to the UL CC #2 in which the UL grant is scheduled.

Figure 6:
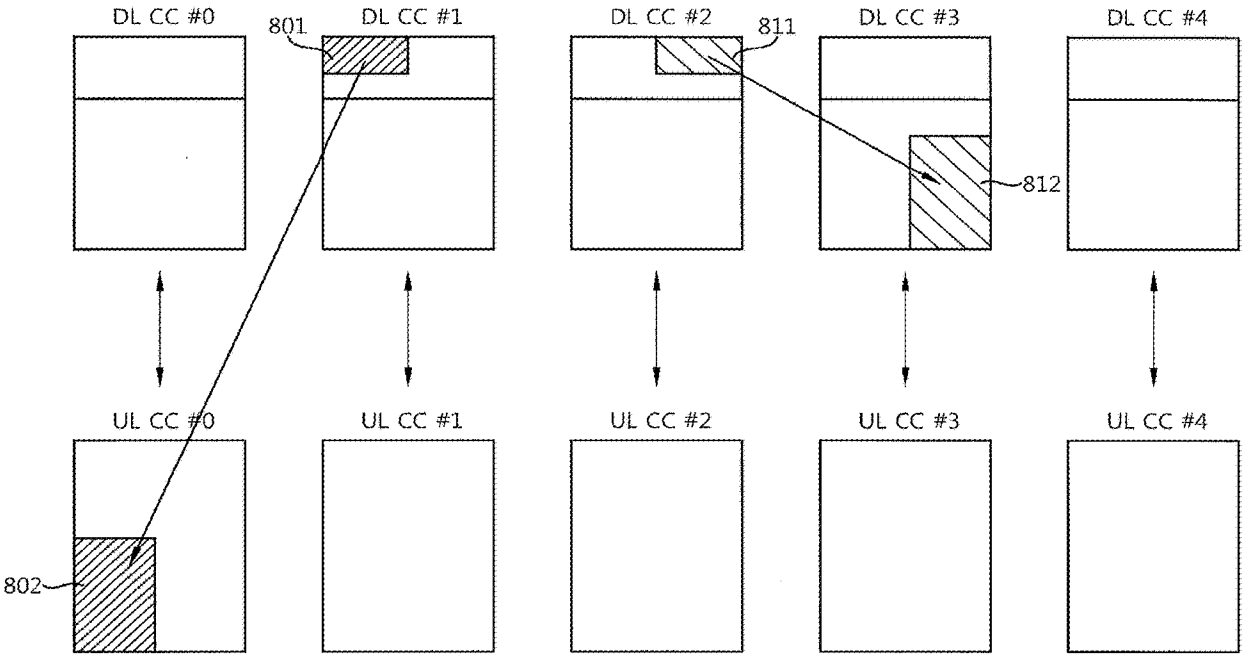
FIG. 6 is a diagram for describing an operation according to an embodiment of the present invention.

FIG. 6 is a diagram for describing an operation according to an embodiment of the present invention. Although there are 5 DL CCs and 5 UL CCs, the number of CCs is not limited thereto. It is assumed that a DL CC #k (0<=k<=4) is linked to a UL CC #k according to a static CC linkage. The static CC linkage can be reported by the BS to the UE by using a part of system information (i.e., MIB or SIB).

It is assumed that a CIF consists of 3 bits, and each value is defined by Table 2 below.

TABLE 2

| CIF value | Description |
|---|---|
| 0 | UL CC index 0 |
| 1 | UL CC index 1 |
| 2 | UL CC index 2 |
| 3 | UL CC index 3 |
| 4 | UL CC index 4 |
| 5 | Reserved |
| 6 | Reserved |
| 7 | UL CC index 0, dynamic CC linkage |

Hereinafter, a CC index of a CIF in a UL grant is an index of a UL CC scheduled by the UL grant. However, in another example, a CC index of a CIF in a UL grant may be an index of a DL CC linked to a UL CC to be scheduled by the UL grant.

DCI of a 1$^{st}$ PDCCH 801 of the DL CC #1 includes a UL grant for scheduling the UL CC #0. The UL grant includes a UL resource allocation 802, a CQI request, and a CIF.

If a value of the CQI request is 0, CQI reporting is not triggered, and if the value of the CQI request is 1, CQI reporting is triggered.

Assume that the value of the CIF included in the UL grant of the 1$^{st}$ PDCCH 801 is set to 0, i.e., an index of the UL CC #0. When CQI reporting is triggered, the UE can report a CQI for the DL CC #0 linked to a UL CC having a CC index 0 (i.e., UL CC #0). That is, when CQI reporting is triggered, the UE reports a CQI of a DL CC linked to a UL CC indicated by a CIF included in the UL grant.

Assume that CQI reporting is triggered, and the CIF value is set to 7 which indicates the dynamic CC linkage. When the CIF value is 7, a UL CC in which a UL grant is scheduled can be predetermined. In this example, if the CIF value is 7, it indicates the UL CC #0. The CIF value indicating the dynamic CC linkage is for exemplary purposes only, and thus can be set to any specific value. When the CIF value indicates the dynamic CC linkage, a UL CC scheduled by a UL grant may be a UL CC defined by a higher layer message such as an RRC message, or may be a UL CC which is predetermined to transmit a control signal.

The dynamic CC linkage indicates CC mapping for CQI reporting. The dynamic CC linkage can indicate at least any one of the following four types.

(1) all available DL CCs (2) all active DL CCs (3) all assigned DL CCs (4) a DL CC group (or DL CC list) including at least one DL CC That is, if the dynamic CC linkage type (4) is used, the UE reports a CQI for DL CCs in a DL CC group.

The dynamic CC linkage may be pre-defined, or may be transmitted by the BS to the UE by using a radio resource control (RRC) message or L1/L2 signaling. The dynamic CC linkage may be UE-specific, UE group-specific, or cell-specific. The dynamic linkage may be specific for each CC or common for each CC.

Which type of dynamic CC linkage will be used can be reported by the BS to the UE by using the RRC message. If the dynamic CC linkage type (4) is used, information regarding a DL CC group for reporting a CQI can be reported by the BS to the UE by using the RRC message.

One or more dynamic CC linkages can be used. In the example of Table 2, if the CIF value is 6, it may indicate the dynamic CC linkage type (1), and if the CIF value is 7, it may indicate the dynamic CC linkage type (4). Alternatively, it is also possible to designate a plurality of dynamic CC linkage types (4) each of which can be designated by using a CIF. For example, if the CIF value is 6, it indicates DL CCs #0 and #1, and if the CIF value is 7, it indicates the DL CCs #2 to #4.

DCI of a $2^{nd}$ PDCCH 811 of a DL CC #2 includes a DL grant for a DL CC #3. The DL grant includes a DL resource allocation 812, a CIF, and a TPC. Assume that the CIF value is set to 3 which is an index of the DL CC #3. The TPC may be a TPC for a UL CC #3 linked to the DL CC #3. Alternatively, the TPC may be a TPC for the UL CC #2 linked to the DL CC #2 in which the $2^{nd}$ PDCCH 811 is transmitted.

Although it is shown in this example that the TPC is included in the DL grant, the TPC may be included in a UL grant. In this case, the TPC may be a TPC for a UL CC indicated by the CIF. Alternatively, the TPC may be a TPC for a UL CC linked to a DL CC in which the UL grant is transmitted.

The proposed invention is also applicable to not only CQI reporting and/or TPC transmission but also other control signals. A CQI request is a signal used when the BS requests the UE to set or trigger a control signal for a corresponding DL CC (or UL CC), and can be called a control setup signal or a control trigger signal.

The dynamic CC linkage is not determined by a specific CIF value, but can be predetermined by using an RRC message or the like. If the CQI request is 0, the UE may not transmit the CQI report, and if the CQI request is 1, the UE may transmit the CQI report according to a dynamic CC linkage determined by using the RRC message.

Although a case where the CQI request is 1 bit is considered in the aforementioned example, more various examples may be possible if the number of bits of the CQI request is increased. Table 3 below shows a configuration depending on each value when the CQI request is 2 bits.

TABLE 3

| Value of CQI request | Description |
|---|---|
| 0 | No CQI reporting |
| 1 | CQI reporting based on static CC linkage |
| 2 | CQI reporting based on $1^{st}$ dynamic CC linkage |
| 3 | CQI reporting based on $2^{nd}$ dynamic CC linkage |

If the CQI request value is 1, the UE reports the CQI according to the static CC linkage. For example, upon receiving a UL grant for a UL CC #1, the UE reports a CQI for a DL CC linked to the UL CC #1. If the CQI request value is 2 or 3, the UE reports a CQI according to the pre-defined $1^{st}$ or $2^{nd}$ dynamic CC linkage. The $1^{st}$ and $2^{nd}$ dynamic CC linkages can be determined by using an RRC message.

Now, an example of CQI reporting will be described in greater detail.

Figure 7:
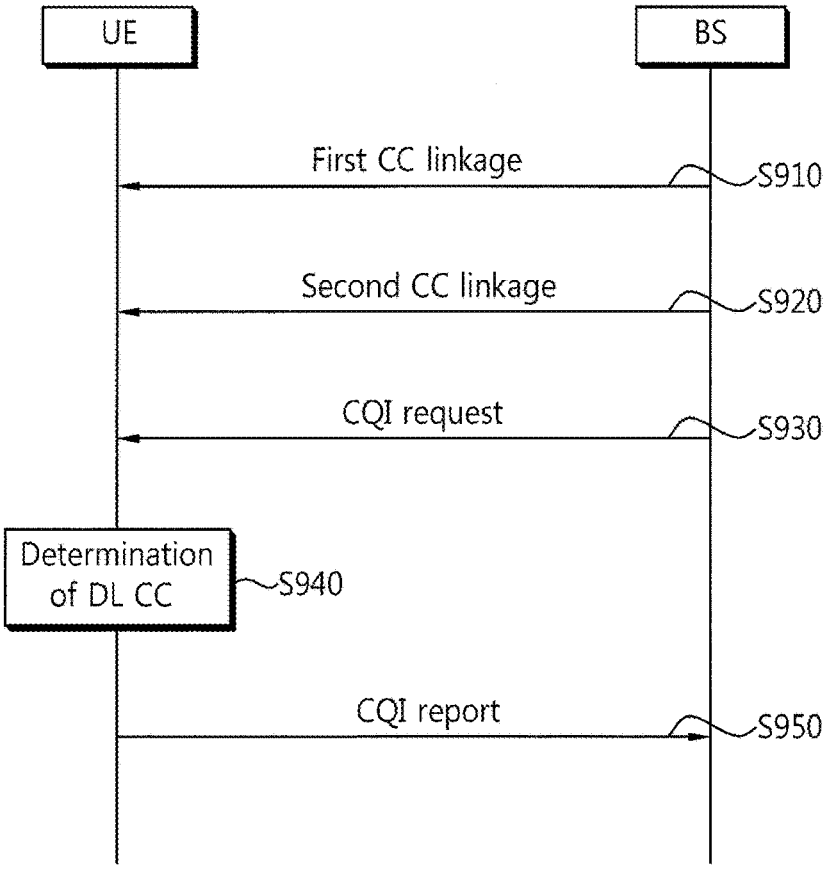
FIG. 7 is a flowchart showing a CQI reporting method according to an embodiment of the present invention.

FIG. 7 is a flowchart showing a CQI reporting method according to an embodiment of the present invention.

A UE receives a $1^{st}$ CC linkage from a BS (step S910). The $1^{st}$ CC linkage can be received as a part of system information, and can be called a static CC linkage.

The UE receives a $2^{nd}$ CC linkage from the BS (step S920). The $2^{nd}$ CC linkage can be received by using an RRC message, and can be called a dynamic CC linkage.

The UE receives a UL grant including a CQI request from the BS (step S930). For example, the CQI request can be configured as shown in Table 3.

When the CQI request is triggered, the UE determines a DL CC in which a CQI is reported according to the CQI request (step S940). For example, if the CQI request value is 3, the UE can determine a DL CC linked based on the $2^{nd}$ CC linkage, that is, the dynamic CC linkage. Alternatively, if the CQI request value is 2, the UE can determine a DL CC linked based on the $1^{st}$ CC linkage, that is, the static CC linkage. Determining of the DL CC according to the dynamic CC linkage and the static CC linkage is described in the embodiment of FIG. 6.

The UE reports a CQI for the determined DL CC to the BS (step S950).

Figure 8:
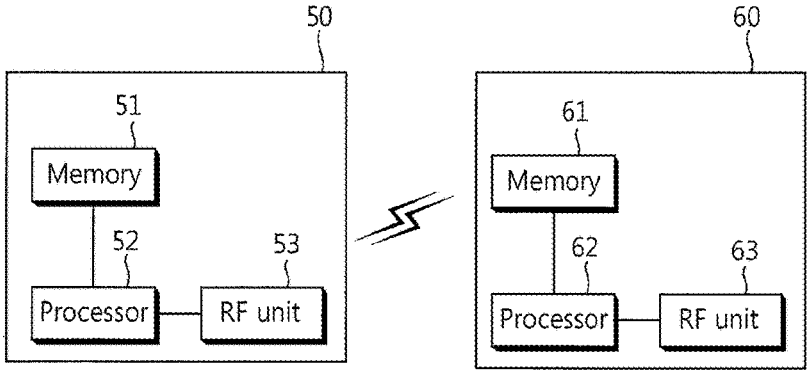
FIG. 8 is a block diagram showing a wireless communication system according to an embodiment of the present invention.

FIG. 8 is a block diagram showing a wireless communication system according to an embodiment of the present invention.

A BS 50 includes a processor 51, a memory 52, and a radio frequency (RF) unit 53. The memory 52 is coupled to the processor 51, and stores a variety of information for driving the processor 51. The RF unit 53 is coupled to the processor 51, and transmits and/or receives a radio signal. The processor 51 implements the proposed functions, procedures, and/or methods. The processor 51 can implement an operation of the BS 50 according to the embodiments of FIG. 6 and FIG. 7.

A UE 60 includes a processor 61, a memory 62, and an RF unit 63. The memory 62 is coupled to the processor 61, and stores a variety of information for driving the processor 61. The RF unit 63 is coupled to the processor 61, and transmits and/or receives a radio signal. The processor 61 implements the proposed functions, procedures, and/or methods. The processor 51 can implement an operation of the UE 60 according to the embodiments of FIG. 6 and FIG. 7.

The processor may include Application-Specific Integrated Circuits (ASICs), other chip sets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

The above-described embodiments include various aspects of examples. Although all possible combinations for describing the various aspects may not be described, those skilled in the art may appreciate that other combinations are possible. Accordingly, the present invention should be construed to include all other replacements, modifications, and changes which fall within the scope of the claims.

The invention claimed is:

[1. A method for reporting channel quality by a device in a wireless communication system, the method comprising:

receiving, by the device, an uplink grant on a physical downlink control channel (PDCCH) through one of a plurality of downlink component carriers (CCs), the uplink grant including an uplink allocation and a channel quality indicator (CQI) request indicating a triggering of CQI reporting, wherein, when a value of the CQI request is set to a first value, the CQI request indicates the triggering of CQI reporting is for one of the plurality of downlink CCs linked to an uplink CC, when the value of the CQI request is set to a second value, the CQI request indicates the triggering of CQI reporting is for a first set of downlink CCs of the plurality of downlink CCs, and when the value of the CQI request is set to a third value, the CQI request indicates the triggering of CQI reporting is for a second set of downlink CCs of the plurality of downlink CCs; and reporting, by the device, a CQI for a downlink CC indicated by the CQI request through an uplink CC based on the uplink allocation.]

[2. The method of claim 1, wherein the uplink grant further includes a carrier indicator field (CIF) indicating the uplink CC in which the uplink allocation is scheduled.]

[3. The method of claim 1, wherein a number of bits for the CQI request is two.]

[4. The method of claim 1, further comprising:

receiving information on the first set of downlink CCs and the second set of downlink CCs.]

[5. The method of claim 1, wherein a linkage between the one of the plurality of downlink CCs linked to the uplink CC is received via system information.]

[6. The method of claim 1, wherein the first value is "1," the second value is "2," and the third value is "3."]

[7. An apparatus configured for reporting channel quality in a wireless communication system, the apparatus comprising:

a radio frequency (RF) unit configured to transmit and receive a radio signal; and a processor coupled to the RF unit and configured to:

receive an uplink grant on a physical downlink control channel (PDCCH) through one of a plurality of downlink component carriers (CCs), the uplink grant including an uplink allocation and a channel quality indicator (CQI) request indicating a triggering of CQI reporting; wherein, when a value of the CQI request is set to a first value, the CQI request indicates the triggering of CQI reporting is for one of the plurality of downlink CCs linked to an uplink CC, when the value of the CQI request is set to a second value, the CQI request indicates the triggering of CQI reporting is for a first set of downlink CCs of the plurality of downlink CCs, and when the value of the CQI request is set to a third value, the CQI request indicates the triggering of CQI reporting is for a second set of downlink CCs of the plurality of downlink CCs; and report a CQI for a downlink CC indicated by the CQI request through an uplink CC based on the uplink allocation.]

[8. The apparatus of claim 7, wherein the uplink grant further includes a carrier indicator field (CIF) indicating the uplink CC in which the uplink allocation is scheduled.]

[9. The apparatus of claim 7, wherein a number of bits for the CQI request is two.]

[10. The apparatus of claim 7, wherein the processor is configured to receive information on the first set of downlink CCs and the second set of downlink CCs.]

[11. The apparatus of claim 7, wherein a linkage between the one of the plurality of downlink CCs linked to the uplink CC is received via system information.]

[12. The apparatus of claim 7, wherein the first value is "1," the second value is "2," and the third value is "3."]

*13. A method for reporting a channel quality indicator (CQI) in a wireless communication system, the method comprising:*

*receiving, by a terminal configured with a plurality of downlink component carriers (CCs), control information via a physical downlink control channel (PDCCH) from a base station, the control information including an uplink allocation and a CQI request, the control information including a carrier indicator (CI) indicating an uplink CC in which the uplink allocation is scheduled; and*

*transmitting, by the terminal to the base station, the CQI via a physical uplink shared channel (PUSCH) of the uplink CC, based on the CQI request and the uplink allocation,*

*wherein the CQI request indicates one of:*

*a triggering of CQI reporting for one downlink CC linked to the uplink CC, indicated by the CI, among the plurality of downlink CCs; and*

*a triggering of CQI reporting for a first group of downlink CCs among the plurality of downlink CCs.*

*14. The method of claim 13, wherein:*

*if a value related to the CQI request is set to a first value, the CQI request indicates the triggering of CQI reporting for the one downlink CC, and*

*if the value related to the CQI request is set to a second value, the CQI request indicates the triggering of CQI reporting for the first group of downlink CCs among the plurality of downlink CCs.*

*15. The method of claim 14, wherein, if the value related to the CQI request is set to a third value, the CQI request indicates a triggering of CQI reporting for a second group of downlink CCs among the plurality of downlink CCs.*

*16. The method of claim 15, further comprising:*

*receiving information on the first group of downlink CCs and the second group of downlink CCs from the base station.*

*17. The method of claim 13, wherein a number of bits for the CQI request is two.*

*18. The method of claim 13, wherein the CQI reporting based on the CQI request corresponds to an aperiodic CQI.*

*19. The method of claim 13, wherein the CQI reporting for the one downlink CC is aperiodic CQI reporting, and when the CQI request indicates the triggering of the aperiodic*

*CQI reporting for the one downlink CC, the one downlink CC is identified by a linkage with the uplink CC indicated by the CI.*

*20. An apparatus configured to transmit a channel quality indicator (CQI) in a wireless communication system, the apparatus comprising:*

*a radio frequency (RF) unit configured with a plurality of downlink component carriers (CCs) and configured to transmit and receive a radio signal; and*

*a processor configured to:*

*control the RF unit to receive control information via a physical downlink control channel (PDCCH) from a base station, the control information including an uplink allocation and a CQI request, the control information including a carrier indicator (CI) indicating an uplink CC in which the uplink allocation is scheduled, and*

*control the RF unit to transmit the CQI via a physical uplink shared channel (PUSCH) of the uplink CC to the base station, based on the CQI request and the uplink allocation,*

*wherein the CQI request indicates one of:*

*a triggering of CQI reporting for one downlink CC linked to the uplink CC, indicated by the CI, among the plurality of downlink CCs; and*

*a triggering of CQI reporting for a first group of downlink CCs among the plurality of downlink CCs.*

*21. The apparatus of claim 20, wherein:*

*if a value related to the CQI request is set to a first value, the CQI request indicates the triggering of CQI reporting for the one downlink CC, and*

*if the value related to the CQI request is set to a second value, the CQI request indicates the triggering of CQI reporting for the first group of downlink CCs among the plurality of downlink CCs.*

*22. The apparatus of claim 21, wherein, if the value related to the CQI request is set to a third value, the CQI request indicates a triggering of CQI reporting for a second group of downlink CCs among the plurality of downlink CCs.*

*23. The apparatus of claim 22, wherein the processor is further configured to:*

*receive information on the first group of downlink CCs and the second group of downlink CCs from the base station.*

*24. The apparatus of claim 20, wherein a number of bits for the CQI request is two.*

* * * * *